United States Patent [19]

Maeda et al.

[11] Patent Number: 4,556,920
[45] Date of Patent: Dec. 3, 1985

[54] REPRODUCTION DEVICE

[75] Inventors: Masaya Maeda; Masahiro Takei, both of Kanagawa, Japan

[73] Assignee: Canon Kabushiki Kaisha, Tokyo, Japan

[21] Appl. No.: 559,223

[22] Filed: Dec. 8, 1983

[30] Foreign Application Priority Data

Dec. 10, 1982 [JP] Japan .............................. 57-216389
Mar. 18, 1983 [JP] Japan .................................. 58-45664

[51] Int. Cl.$^4$ ............................................. G11B 5/56
[52] U.S. Cl. ...................................... 360/77; 360/10.2
[58] Field of Search ........................ 360/10.2, 35.1, 77

[56] References Cited

U.S. PATENT DOCUMENTS

| | | | |
|---|---|---|---|
| 3,293,627 | 12/1966 | Auyang et al. | 360/77 |
| 3,840,893 | 10/1974 | Jacoby et al. | 360/77 |
| 4,007,493 | 2/1977 | Behr et al. | 360/77 |
| 4,074,328 | 2/1978 | Hardwick | 360/77 |
| 4,321,634 | 3/1982 | Lehureau | 360/70 |
| 4,347,534 | 8/1982 | Kimura | 360/77 |
| 4,418,366 | 11/1983 | Moriya | 360/75 |
| 4,419,700 | 12/1983 | Ragle et al. | 360/77 |
| 4,486,792 | 12/1984 | Edakubo et al. | 360/10.2 |

FOREIGN PATENT DOCUMENTS

| | | | |
|---|---|---|---|
| 0040066 | 11/1981 | European Pat. Off. | 360/10.2 |
| 58-107784 | 6/1983 | Japan | 360/10.2 |

OTHER PUBLICATIONS

Research Disclosure No. 178, Feb. 1979, pp. 58–61, #17810, Video Recording and Reproducing Apparatus having Variable Reproduction Speeds.

Primary Examiner—George G. Stellar
Attorney, Agent, or Firm—Toren, McGeady, Stanger, Goldberg & Kiel

[57] ABSTRACT

In the disclosed device first and second reproduction heads contact two recording tracks on a recording medium, and a tracking control controls their tracking such that there is no difference in outputs between the first and second reproduction heads. The distance between the two reproduction heads is set so that tracking deviations from a normal course cause the outputs of the two heads to differ according to the direction and amount of the deviation.

20 Claims, 20 Drawing Figures

FIG. 1
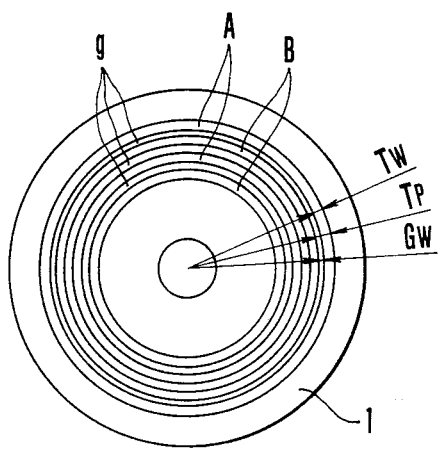
FIG. 2(a)
PRIOR ART
FIG. 2(b)
PRIOR ART
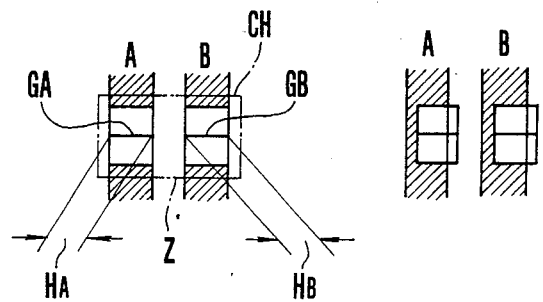

REPRODUCTION DEVICE

BACKGROUND OF THE INVENTION

1. Field of the Invention

The present invention relates to a reproduction device to reproduce information in the recording tracks of a recording medium, and particularly to a reproduction device having tracking control means.

While such devices may reproduce information from a magnetic recording medium or an optical recording medium, this specification refers mainly to an embodiment of devices that reproduce information from a magnetic recording medium. However, the present invention is not limited to reproduction from a magnetic recording medium.

2. Description of the Prior Art

Heretofore, it has been difficult to have the head of a magnetic disk reproduction device or a magnetic tape reproduction device accurately face-contact, i.e. come into face to face contact, with a recording track. This is the case because of the accuracy required in positioning the magnetic head, eccentricity of the magnetic disk, and errors in the tape feed, etc. Therefore, it is desirable to use some form of tracking control means.

Detecting the direction of deviation from a track on the basis of only a head's reproduction level is especially difficult in a magnetic disk reproduction device. This will be evident from an example of a device that reproduces video signals from a magnetic disk that has video signals of one frame or one field recorded on a number of respective tracks.

FIG. 1 shows a recording pattern on a magnetic disk 1. As shown in the drawing, odd number fields of video signals are recorded on tracks A, while even number fields of the same are alternately recorded on tracks B. Video signals are frequency modulated and recorded both on tracks A and B. Guard bands "g" between the tracks A and the tracks B prevent crosstalk. An annular track A or B has video signals of one field recorded thereon. Both in recording and in reproducing the disk 1 rotates, for example, with a field frequency of NTSC TV signals (3,600 rpm). At the time of recording, a track width TW, a track pitch TP, and a guard band width GW are preset, and the head position is controlled at the time of recording to record according to a given format.

Conventionally, a so-called combination head CH having two gaps GA and GB shown in FIG. 2(a) is used to reproduce video signals from such a magnetic disk. Gap distances of the gaps GA and GB of the combination head CH are set equal to the track pitch TP, and gap widths HA and HB are also set equal to the track width TW. The heads HA and HB read out video signals of the odd number field tracks A and the even number field tracks B in turn to reproduce one static picture. However, when the heads deviate from the tracks as shown in FIG. 2(b) because of errors in a head positioning mechanism, etc., their reproduction outputs will be damped. This makes it necessary to correct the positional deviation of heads from the tracks. However the reproduction output levels in heads with the head shapes shown in FIG. 2 will be low, and the direction of deviation of the heads cannot be detected.

To overcome this problem, a so-called Dither control system serves to vibrate the magnetic heads at a prescribed frequency and transverse to the direction of the tracks, and detects the direction of deviation of the tracks on the basis of the shift deviation of the heads and change in the detected output. While such a control system can detect the direction of deviation, a complicated control circuit is required. At the same time the head vibration creates jittering in the time base. Thus it is not especially suited for reproduction of the video signals, etc.

SUMMARY OF THE INVENTION

It is an object of the present invention to provide a reproduction device which is completed in view of the shortcomings of the prior art and can easily detect the direction of positional deviation of heads and perform the tracking control.

More specifically, it is an object of the present invention to provide a reproduction device which has two reproduction heads facing two recording tracks, and makes widths of the reproduction heads different from track widths, and positions both reproduction heads in such a manner that either both outside edges of the tracks match with outside edges of the two reproduction heads, or both inside edges of the tracks match with the inside edges of the heads.

It is another object of the present invention to provide a reproduction device in which when reproduction characteristics of two reproduction heads are different from each other, means is provided to compensate the difference in the reproduction characteristics so that correct tracking control can be effected.

Other objects of the present invention will be made clear from the following detailed description given with reference to the accompanying drawings.

BRIEF DESCRIPTION OF THE DRAWINGS

FIG. 1 is a drawing to show a recording format on a magnetic disk.

FIGS. 2(a) and (b) show a prior art.

DETAILED DESCRIPTION OF THE PREFERRED EMBODIMENTS

Embodiments of the present invention are described with reference to the drawings.

FIG. 1 which shows the recording pattern of a magnetic disk which can be applied to the present invention, is explained above and requires no further explanation.

Figure 3A:
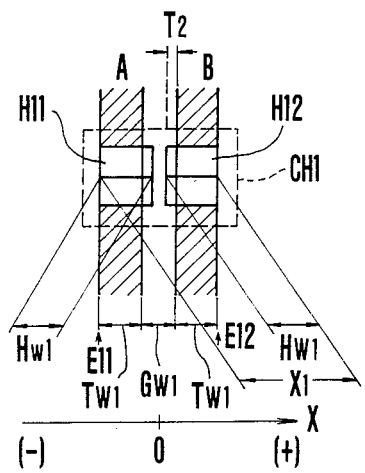
FIGS. 3(a), (b), FIGS. 4(a), (b), FIGS. 5(a), (b), and FIGS. 6(a), (b) show positions and shapes of heads in a case when guard bands are provided.

FIG. 3(a) shows head shapes and positions in one embodiment according to the present invention.

As shown in FIG. 3(a), widths of tracks A and B are set at TW1, and the distance between adjacent edges of the tracks A and B which adjoin to each other transverse to the direction of the tracks, that is the width of a guard band, is set at GW1. Gap widths of heads H11, H12 are set at HW1, and the distance X1 between unadjacent side edges E11, E12 of both head gaps is set at $$X1 = 2TW1 + GW1 \tag{1}$$

Figure 3B:
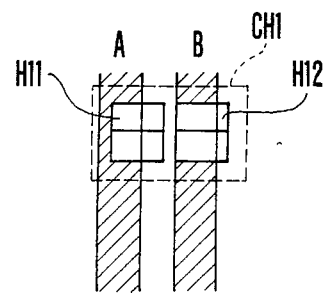

That is, the distance X1 is set so as to equal to the distance between non-adjoining edges of the tracks A, B in the direction transverse to the tracks. When the entire combination head CH1 deviates to the right in FIG. 3(b), such an arrangement causes the level of the output of the reproduction of the head H11 become lower than that of the output of the reproduction of the head H12. This allows the direction of the deviation of the heads relative to the tracks to be detected. In this case, the reproduction heads are arranged for face-contact with adjoining tracks. When the reproduction heads are arranged for face-contact with tracks separated from each other by a number of tracks, the above formula (1) is changed to:

$$X1 = 2TW1 + GW1 + nTP \, (n=0, 1, 2 \ldots) \tag{2}$$

wherein $n=0$ in FIG. 3, and n represents the number of tracks existing between both heads, while TP represents the track pitch.

Figure 4A:
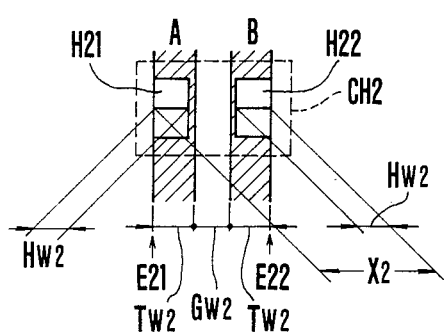

FIG. 4(a) shows a second embodiment of the head arrangement according to the present invention wherein the gap widths are made narrower than the track widths. As shown in FIG. 4(a), the widths of tracks, A, B are set at TW2, and the width of the guard band is set at GW2, while the gap widths of heads H21, H22 are set at HW2. The distance X2 between non-adjoining edges E21, E22 of both head gaps are set at:

$$X2 = 2TW2 + GW2 \tag{3}$$

If the above formula is generalized as mentioned above, the following equation is obtained:

$$X2 = 2TW2 + GW2 + nTP(n=0, 1, 2, \ldots) \tag{4}$$

Figure 4B:
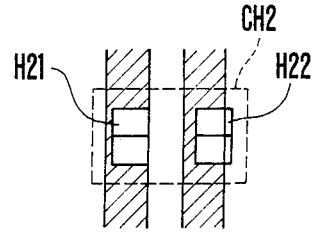

Here also, when the combination head CH2 deviates to the right in FIG. 4(b), output reproduced by the head H22 becomes lower than that of the head H21.

Figure 5A:
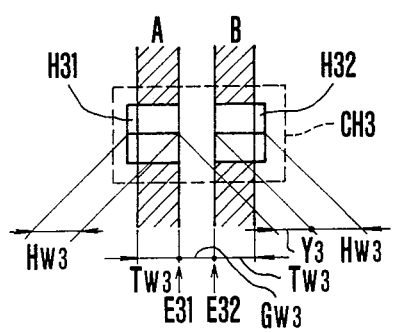
Figure 5B:
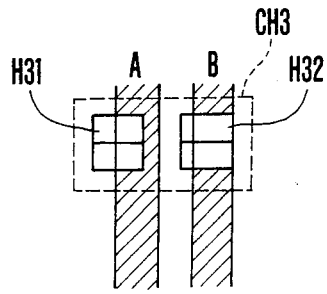

FIGS. 5, 5(a) and 5(b) show a third embodiment of the head arrangement according to the present invention. In FIG. 5(a), the widths of tracks A, B are set at TW3, and the width of the guard band is set at GW3, while the gap widths of heads H31, H32 are set at HW3. And the distance Y3 between adjacent edges E31, E32 of both head gaps is set at:

$$Y3 = GW3 \tag{5}$$

That is, the distance Y3 is so set equal to the distance GW3 between adjacent edges of adjoining tracks A, B in the direction transverse to the tracks.

With such arrangements, if the combination head CH3 deviates to the left direction in FIG. 5(b), the output reproduced by the head H31 will have a level lower than that of the output reproduced by the head H32. Thus the direction of deviation the heads can be detected. Also, the amount of deviation of the heads can be detected by the difference in reproduction levels.

If the formula (5) is generalized in the same manner as in the first and second embodiments, the following equation will be obtained:

$$Y3 = GW3 + mTP(m=0, 1, 2 \ldots) \tag{6}$$

wherein m represents a number of tracks existing between both heads.

Figure 6A:
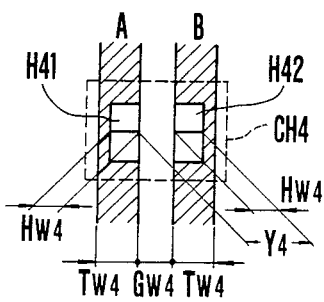
Figure 6B:
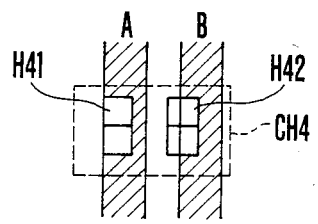

FIGS. 6(a) and (b) show a fourth embodiment in which the gap width GW4 is made narrower than the track widths TW4 as compared to the embodiment shown in FIGS. 5(a) and 5(b). In this case also, the arrangement is such as to satisfy the following condition:

$$Y4 = GW4 + mTP(m=0, 1, 2 \ldots) \tag{7}$$

The embodiments shown above are for cases where a guard band is provided. Fifth and sixth embodiments shown in FIGS. 7(a), 7(b), 8(a), and 8(b) illustrate reproduction head shapes and positions where the guard band is eliminated, and overlapped recordings are made on a portion of the tracks. This results in a so-called azimuth recording with odd number field tracks and even number field tracks.

Figure 7A:
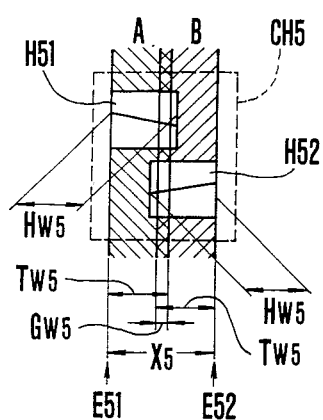
FIGS. 7(a), (b) and FIGS. 8(a), (b) show positions and shapes of heads in a case when guard bands are not provided.

In FIG. 7(a), the widths of tracks A, B are set at TW5, and the distance between adjoining edges in the transverse direction of the tracks, that is the width of the overlapped part is set at GW5, while heads H51, H52 have different azimuth angles from each other and their gap widths are set at HW5. Here, the width GW5 of the overlapped portion shows a negative value because of the overlapping, while the corresponding width in the first to fourth embodiments shows a positive value. Further, in this embodiment, the distance X5 between unadjacent both edges E51, E52 of both head gaps is set at:

$$X5 = 2TW5 + GW5 \tag{8}$$

Figure 7B:
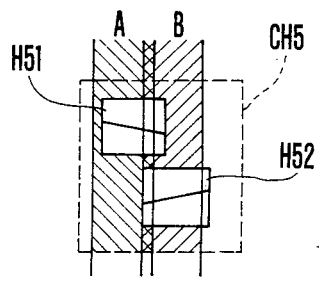

That is, the distance X5 is set equal to the distance between unadjacent edges of the tracks A, B in the transverse direction of the tracks. In such an arrangement, as shown in FIG. 7(b), when, for instance, the combination head CH5 deviates to the right in the drawing, the reproduction output of the head H51 will have a lower level than that of the head H52. Thus the deviation direction can be detected. Also, the amount of deviation can be detected by the difference in the reproduction outputs. The formula (8) can be generalized as shown below in the same manner as in the first to fourth embodiments:

$$X5 = 2TW5 + GW5 + nTP(n=0, 1, 2 \ldots) \tag{9}$$

While the fifth embodiment is based on the relation, $HW5 > TW5$, even if the relationship becomes $HW5 < TW5$, the formulas (8) and (9) can also stand.

Figure 8A:
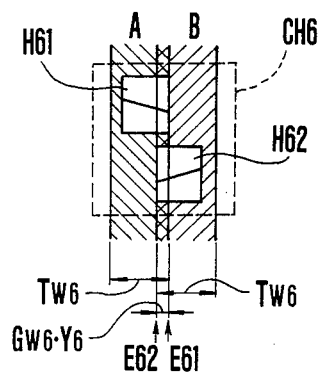
Figure 8B:
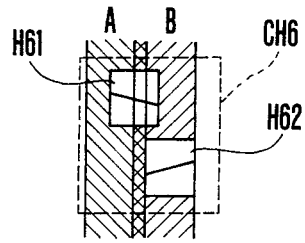

FIGS. 8(a) and 8(b) illustrate a sixth embodiment of the head arrangement according to the present invention. As shown in FIG. 8(a), the widths of tracks A, B are set at TW6, and the width of the overlapped portion of both tracks is set at GW6, while the gap widths of heads H61, H62 are set at HW6. Here, GW6 has a negative value as in the fifth embodiment.

And the distance Y2 between adjacent edges E61, E62 of both head gaps (here Y6 has a negative value as the head gaps overlap with each other) is set at:

$$Y6 = GW6 \tag{10}$$

That is, the distance Y6 is set so as to equal to the distance GW6 between the adjacent edges of the adjoining tracks A, B in the transverse direction of the tracks. By such arrangement, as shown in FIG. 8(b), if the combination head CH6 deviates to the right direction in the drawing, the reproduction output of the head H61 has a lower level than that of a reproduction output of the head H62, thus the direction of deviation as well as the amount of deviation can be detected. Also, the formula (10 can be generalized as shown below in the same manner as in the above-mentioned embodiments:

$$Y6 = GW6 + mTP(m=0, 1, 2 \ldots) \quad (11).$$

While the relation, HW6<TW6 is set in the sixth embodiment, the formula (10) and the formula (11) can also be used in the case of HW6>TW6.

As has been explained above, the reproduction outputs of both heads will exhibit levels different from each other with the deviation of the heads. This allows the detection of the deviation direction and the amount of deviation. The widths of reproduction heads are made different from the widths of recording tracks. The distance Y between adjacent edges of first and second reproduction head gaps in the direction transverse to the tracks has the following relation to the distance GW between adjacent edges of adjoining tracks in the direction transverse to the tracks and the track pitch TP:

$$Y = GW + mTP(m=0, 1, 2 \ldots) \quad (12),$$

Alternatively the distance X between the other edges of each head gap in the above-mentioned transverse direction has approximately the following relation relative to the track width TW, the distance GW, and the track pitch TP:

$$X = 2TW + GW + nTP(n=0, 1, 2, \ldots) \quad (13).$$

Figure 9A:
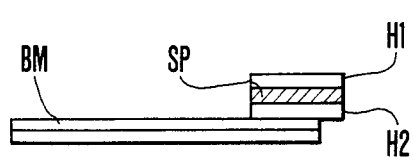
FIGS. 9(a), (b) show a manner in which heads are mounted on a bi-morph plate.

FIGS. 9(a) and (b) show the manner in which heads mentioned above are mounted on a bi-morph plate. In these drawings, H1 is a head corresponding to the heads H11, H21, H31, H41, while H2 is a head corresponding to H12, H22, H32, H42. And G1 is a gap of the head H1, and G2 is a gap of the head H2, while SP is a spacer to set a distance between the heads H1, H2. BM is a bi-morph plate. By impressing a voltage to the bi-morph plate BM, both heads H1, H2 move.

Figure 10:
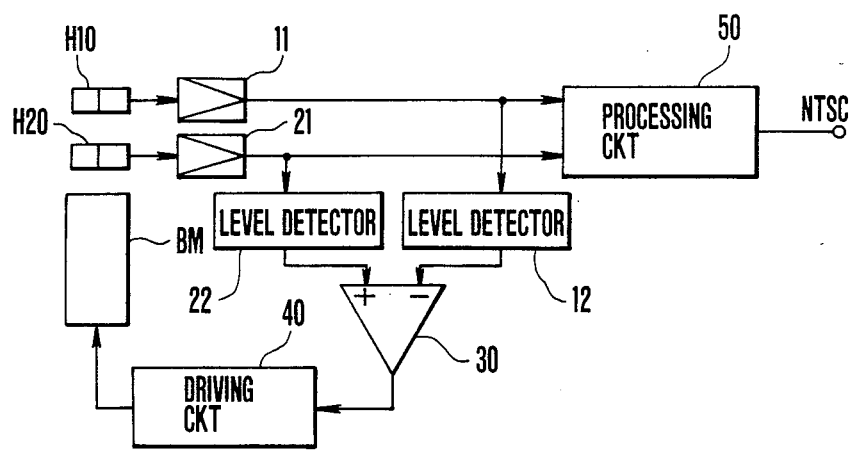
FIG. 10 is a tracking control circuit diagram using heads of embodiments shown in FIGS. 1 to 6.

FIG. 10 shows an embodiment of a tracking control circuit to which all of the above-mentioned embodiments can be applied. In this drawing, a head H10 corresponds to the heads H11, H21, H31, H41, H51, H61 and a head H20 corresponds to the heads, H12, H22, H32, H42, H52, H62. The circuit includes amplifiers 11 and 21, envelope detectors 12 and 22, a differential amplifier 30, a driving circuit 40 for a bi-morph plate BM, and a processing circuit 50 to provide an NTSC signal.

Figure 9B:
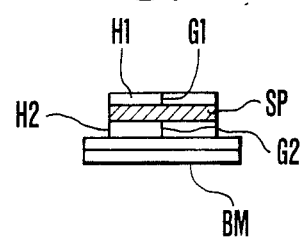

Outputs of the heads H10, H20 are respectively amplified as the amplifiers 11, 21 and are envelope detected by the level detectors 12, 22. And signals produced from the differential amplifier 30 indicate reproduction levels, that is signals to indicate both of the direction of deviation and the difference in the reproduction level, i.e., an amount of deviation, then these signals are impressed to the driving circuit 40. The driving circuit 40 drives the bi-morph plate shown in FIG. 9 and shifts a member to which both heads H10, H20 are installed, thus making a tracking control.

On the other hand, the processing circuit 50 alternately selects outputs of the heads H10, H20, for converting the reproduction outputs to TV signals of NTSC standards.

Figure 11:
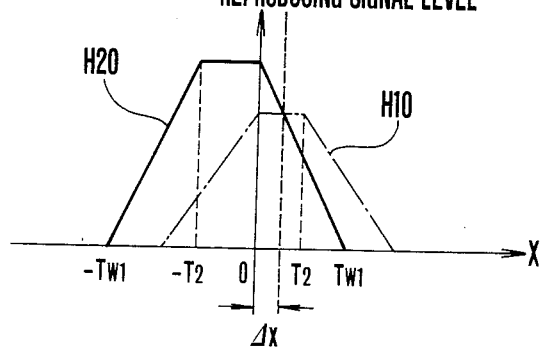
FIG. 11 shows a relationship between the head positions and the reproduction output levels when two heads having different reproduction characteristics are used.

However, when there is a difference in the reproduction characteristics between the heads H10, H20 and a level difference between them is created, then if the reproduction characteristic of the head H11 shown in FIG. 3 is inferior to that of the head H12, as shown in FIG. 11, the head H10 will be stabilized at a position deviating by $\Delta X$ in the positive direction of X (a direction perpendicularly crossing with the track) wherein the same level point is regarded as a just tracking point). Then when tracking in a condition, (1) when a moving element of the bi-morph plate or a fixed position of an arm is at the positive side of X, ordinarily the tracking tends to move in the negative direction of X, but in this case the tracking tends to move in a direction offsetting the same that is to move in the positive direction of X, thus there is no problem, but (2) when the moving element or the position of arm is at the negative side of X, if a tracking is made as it is, the strain is accelerated, leaving permanent strain when a long time reproduction is made, thus creating a problem.

Also, if there is a difference in the reproduction level, the tracking will be stabilized in a low level side in a just tracking state without fail, creating a shortcoming of deteriorating S/N.

Figure 12:
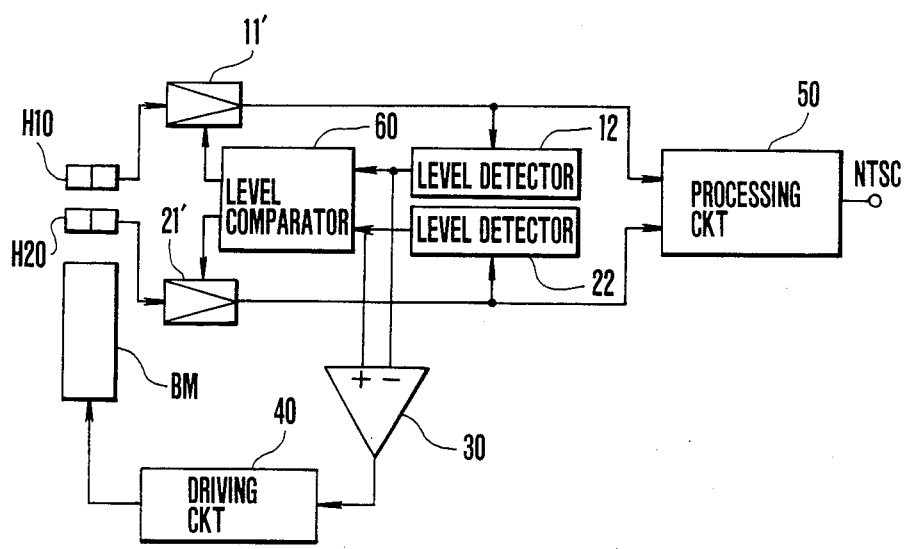
FIG. 12 is a tracking control circuit diagram of an embodiment of the present invention.

FIG. 12 shows a tracking control circuit diagram in which such problems are solved. In the drawing, parts having same functions as those shown in FIG. 10 are identified with same numbers or marks, wherein 11', 21' are AGC amplifiers and 60 is a level comparator.

Signals reproduced from the heads H10, H20 are introduced respectively into the AGC amplifiers 11', 21', which can vary gains and one of outputs thereof is connected to the processing circuit 50 and becomes NTSC signal, while the others are introduced into the level detectors 12, 22. Here, an average value of brightness of the reproduction signals may be secured by introducing the same into an integration circuit having a large time constant, etc. The two levels thus obtained are introduced into the level comparator 60. Then, the levels are compared and depending on the comparison results, the gain of the variable amplifier having a lower level is increased so that the outputs will have the same levels. The outputs of the level detectors 12, 22 having their levels equalized by a feed back loop are introduced into the differential amplifier 30, thereby impressing a control voltage corresponding to the amount of deviation not including the $\Delta X$ shown in FIG. 11 to the bi-morph plate BM. Therefore the amount of strain will be reduced and at the same time generation of a permanent strain will be eliminated. Also, as the amplification of the amplifier having a lower reproduction level is increased in this embodiment, the reproduction output as a whole is increased and the deterioration of S/N will also be reduced.

Also, while both first and second heads are used for reproduction for read out signals of two fields per one frame in this embodiment, when signals of one field per one frame are read out, one of the heads may be used for the reproduction and the tracking control may be effected by both heads. In either case, an auxiliary head used solely for the tracking control will not be needed. But, when signals of one field per one frame are reproduced, there will be no inter-relationship between the signal levels of both tracks, therefore a pilot signal may be recorded at each track in such case and the reproduction levels of the pilot signals are compared, thereby effecting the tracking control.

While so-called in-line type of combination heads having gaps linearly lined up are used in the embodiments of head arrangement shown in FIG. 1 to FIG. 4, combination heads of so-called stagger type in which gaps are staggered to each other may be used as in the fifth and sixth embodiments. The stagger type may be desirable in respect to a crosstalk or a wider head width it can secure.

While these explanations refer to a disk type recording medium in this embodiment, the present invention may be applied to a reproduction device which reproduces information on a recording medium such as tape, etc. as it is.

Also, while these explanations refer to a magnetic medium, the present invention can be applied to all types of reproduction devices in which reproduction outputs vary when deviation from tracks takes place.

Further, while a bi-morph plate is used as tracking control means, other types of member may be used for shifting heads.

However, when a bi-morph plate is used, a voltage by difference in reproduction characteristics of both heads will now be impressed on the bi-morph plate, thus generation of a permanent strain can be eliminated.

As has been explained above, according to the present invention, the detection of deviation direction and the amount of deviation in tracking can be made without using a Dither system. Also, even if there is a difference in reproduction characteristics of two reproduction heads, the difference may be compensated.

Also, the present invention is not limited to the embodiments mentioned above, instead various applications and modifications within the scope of the present invention can be made.

What we claim:

1. A reproduction device comprising:
   first and second reproduction heads respectively face-contacting two recording tracks on a recording medium; and
   tracking control means for eliminating a difference in reproduction outputs of the first and second reproduction heads,
   the first and second reproduction heads having widths different from widths of recording tracks, and a distance Y between adjacent edges of first and second head gaps in the direction transverse to the tracks being set against a distance GW between adjacent edges of adjoining tracks in the direction transverse to the tracks and a track pitch TP having approximately the following relation:

$Y = GW + mTP (m = 0, 1, 2 ...)$, or, a distance X between the other edges of each head gap transverse to the tracks having approximately the relation shown below relative to the track width TW, the distance GW and the track pitch TP:

$X = 2TW + GW + nTP (n = 0, 1, 2 ...)$.

2. A reproduction device according to claim 1, wherein widths of the first and second reproduction heads are set wider than widths of the recording tracks.

3. A reproduction device according to claim 1, wherein, is set m=0, is set.

4. A reproduction device according to claim 1, wherein, is set n=0, is set.

5. A reproduction device according to claim 1, wherein the first and second reproduction heads have respectively different azimuth angles.

6. A reproduction device according to claim 1, wherein gaps of the first and second reproduction heads deviate from each other.

7. A reproduction device according to claim 1, wherein the tracking control means has a bi-morph plate on which the first and second reproduction heads are mounted.

8. A reproduction device according to claim 1, wherein the tracking control means has two automatic gain control circuits to respectively amplify outputs of the first and second reproduction heads and control variations of gains thereof.

9. A reproduction device according to claim 1, wherein the recording medium is a magnetic recording medium, and the first and second reproduction heads are magnetic heads.

10. A reproduction device according to claim 1, wherein the recording medium has a circular shape.

11. A reproduction device comprising:
    first and second reproduction heads respectively face-contacting two recording tracks on a recording medium;
    first and second amplifiers to amplify reproduction outputs of the first and second reproduction heads;
    tracking control means to reduce differences in the outputs of the first and second amplifiers to zero; and
    gain adjusting means to adjust gains of the first and second amplifiers to compensate for reproduction characteristics of the first and second reproduction heads.

12. A reproduction device according to claim 11, wherein the first and second reproduction heads are arranged so that widths of said heads are different from the widths of the recording tracks, and a distance Y between adjacent edges of the first and second reproduction head gaps in the direction transverse to the track have approximately the following relation relative to a distance GW between adjacent edges of adjoining tracks in the direction transverse to the tracks, and the track pitch TP:

$Y = GW + mTP (m = 0, 1, 2 ...)$, or a distance X between the other edges of each head gap in the direction transverse to the tracks have approximately the following relation relative to the track width TW, the distance GW, and the track pitch TP:

$X = 2TW + GW + nTP (n = 0, 1, 2 ...)$.

13. A reproduction device according to claim 12, wherein widths of the first and second reproduction heads are wider than the widths of the recording tracks.

14. A reproduction device according to claim 12, wherein, is set m=0, is set.

15. A reproduction device according to claim 12, wherein, is set n=0, is set.

16. A reproduction device according to claim 12, wherein the first and second reproduction heads have different azimuth angles.

17. A reproduction device according to claim 12, wherein gaps of the first and second reproduction heads deviate from each other.

18. A reproduction device according to claim 12, wherein the tracking control means has a bi-morph plate on which the first and second reproduction heads are mounted.

19. A reproduction device according to claim 11, wherein the recording medium is a magnetic recording medium and the first and second reproduction heads are magnetic heads.

20. A reproduction device according to claim 11, wherein the recording medium has a circular shape.

* * * * *